United States Patent
Li et al.

(10) Patent No.: US 7,233,708 B2
(45) Date of Patent: Jun. 19, 2007

(54) SYSTEMS AND METHODS FOR INDEXING AND RETRIEVING IMAGES

(75) Inventors: Mingjing Li, Beijing (CN); Lei Zhang, Beijing (CN); Yan-Feng Sun, Beijing (CN); Hong-Jiang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 748 days.

(21) Appl. No.: 10/703,300

(22) Filed: Nov. 7, 2003

(65) Prior Publication Data

US 2005/0100221 A1 May 12, 2005

(51) Int. Cl.
*G06K 9/54* (2006.01)
(52) U.S. Cl. .................. 382/305; 382/206; 382/218
(58) Field of Classification Search ............. 382/224, 382/248, 250, 280, 206, 305, 190, 218, 263, 382/299; 358/521, 1.9, 1.16, 447
See application file for complete search history.

(56) References Cited

U.S. PATENT DOCUMENTS 5,828,792 A * 10/1998 O'Gorman .................. 382/263
5,963,670 A * 10/1999 Lipson et al. ............... 382/224
6,223,183 B1    4/2001 Smith et al. ................. 707/102
6,381,365 B2 *  4/2002 Murakawa .................. 382/190
6,987,587 B2 *  1/2006 Sekizawa et al. ............ 358/1.9

FOREIGN PATENT DOCUMENTS

JP    2000020721 A  *  1/2000

* cited by examiner

*Primary Examiner*—Anh Hong Do
(74) *Attorney, Agent, or Firm*—Lee & Hayes, PLLC

(57) ABSTRACT

Systems and methods for indexing and retrieving images are described herein. The systems and methods analyze an image to determine its texture moments. The pixels of the image are converted to gray scale. Textural attributes of the pixels are determined. The textural attributes are associated with the local texture of the pixels and are derived from coefficients of Discrete Fourier Transform associated with the pixels. Statistical values associated with the textural attributes of the pixels are calculated. The texture moments of the image are determined from the statistical value.

31 Claims, 7 Drawing Sheets

A1 — 301

| -1 | 1 | -1 |
|---|---|---|
| 1 | 0 | 1 |
| -1 | 0 | -1 |

A2 — 302

| 0 | -$\sqrt{2}$ | 0 |
|---|---|---|
| $\sqrt{2}$ | 0 | $\sqrt{2}$ |
| 0 | -$\sqrt{2}$ | 0 |

A3 — 303

| -$\sqrt{2}$ | 0 | $\sqrt{2}$ |
|---|---|---|
| 0 | 0 | 0 |
| $\sqrt{2}$ | 0 | -$\sqrt{2}$ |

A4 — 304

| 1 | 0 | -1 |
|---|---|---|
| $\sqrt{2}$ | 0 | -$\sqrt{2}$ |
| 1 | 0 | -1 |

A5 — 305

| -1 | -$\sqrt{2}$ | -1 |
|---|---|---|
| 0 | 0 | 0 |
| 1 | $\sqrt{2}$ | 1 |

A6 — 306

| 1 | 0 | -1 |
|---|---|---|
| -$\sqrt{2}$ | 0 | $\sqrt{2}$ |
| 1 | 0 | -1 |

A7 — 307

| -1 | $\sqrt{2}$ | -1 |
|---|---|---|
| 0 | 0 | 0 |
| 1 | -$\sqrt{2}$ | 1 |

Fig. 3

SYSTEMS AND METHODS FOR INDEXING AND RETRIEVING IMAGES

TECHNICAL FIELD

The systems and methods described herein relate to image indexing and retrieval.

BACKGROUND

The popularity of digital images is rapidly increasing due to improving digital imaging technologies and easy availability facilitated by the Internet. More and more digital images are becoming available every day.

Automatic image retrieval systems provide an efficient way for users to navigate through the growing numbers of available images. Some existing conventional image retrieval systems catalog images by associating each image with one or more human-chosen keywords. One problem with these keyword-based image management systems is that it can be difficult or even impossible for a person to precisely describe the inherent complexity of certain images. As a result, retrieval accuracy can be severely limited because images that cannot be described or can only be described ambiguously will not be successfully retrieved. Another problem with keyword-based image management systems is that each image has to be manually inspected and carefully annotated. These steps are extremely labor intensive and prohibitively costly, especially for a database with a large number of images.

Recently, some image management systems that use content-based image retrieval (CBIR) have begun to emerge. Typically, a CBIR system is capable of identifying visual (i.e. non-semantic) features of a reference image and finding other images with those similar features. These visual features include color correlogram, color histogram, and wavelet features. To obtain these visual features of an image, substantial computational power is required in order to obtain meaningful and useful results.

Thus, there is a need for a CBIR system that employs visual features that are simple to calculate and capable of yielding accurate image retrieval results.

SUMMARY

The systems and methods described herein are directed at indexing and retrieving images. In one aspect, the systems and methods analyze an image to determine its texture moments. The pixels of the image are converted to a gray scale format. Textural attributes of the pixels are determined. The textural attributes are associated with the local texture of the pixels and are derived from Discrete Fourier Transform coefficients. Statistical values associated with the textural attributes of the pixels are calculated. The texture moments of the image are determined from the statistical values.

In another aspect, texture moments are used for searching a data store for images with specified visual features. In yet another aspect, the texture moments are used for indexing images in a data store.

BRIEF DESCRIPTION OF THE DRAWINGS

FIG. 3 shows seven templates that graphically illustrate seven textural attributes.

DETAILED DESCRIPTION

Content-based image retrieval (CBIR) systems are generally configured to retrieve images that have certain specified visual features. These visual features are typically related to the colors of the images. Calculating color-related visual features for an image is often time-consuming and computationally intensive. Also, black and white images and images with minimal color variations typically cannot be effectively retrieved using color-related visual features.

Thus, the systems and methods discussed herein provide for indexing and retrieving images using texture moments. These systems and methods enable a CBIR system to efficiently calculate the texture moments for an image for indexing and retrieval purposes. Texture moments are color-independent and can yield better results than other visual features even if the texture moments are implemented in fewer dimensions than the other visual features. Texture moments, which are parameters that summarize the local textural attributes of an image, are also relatively simple to compute.

Figure 1:
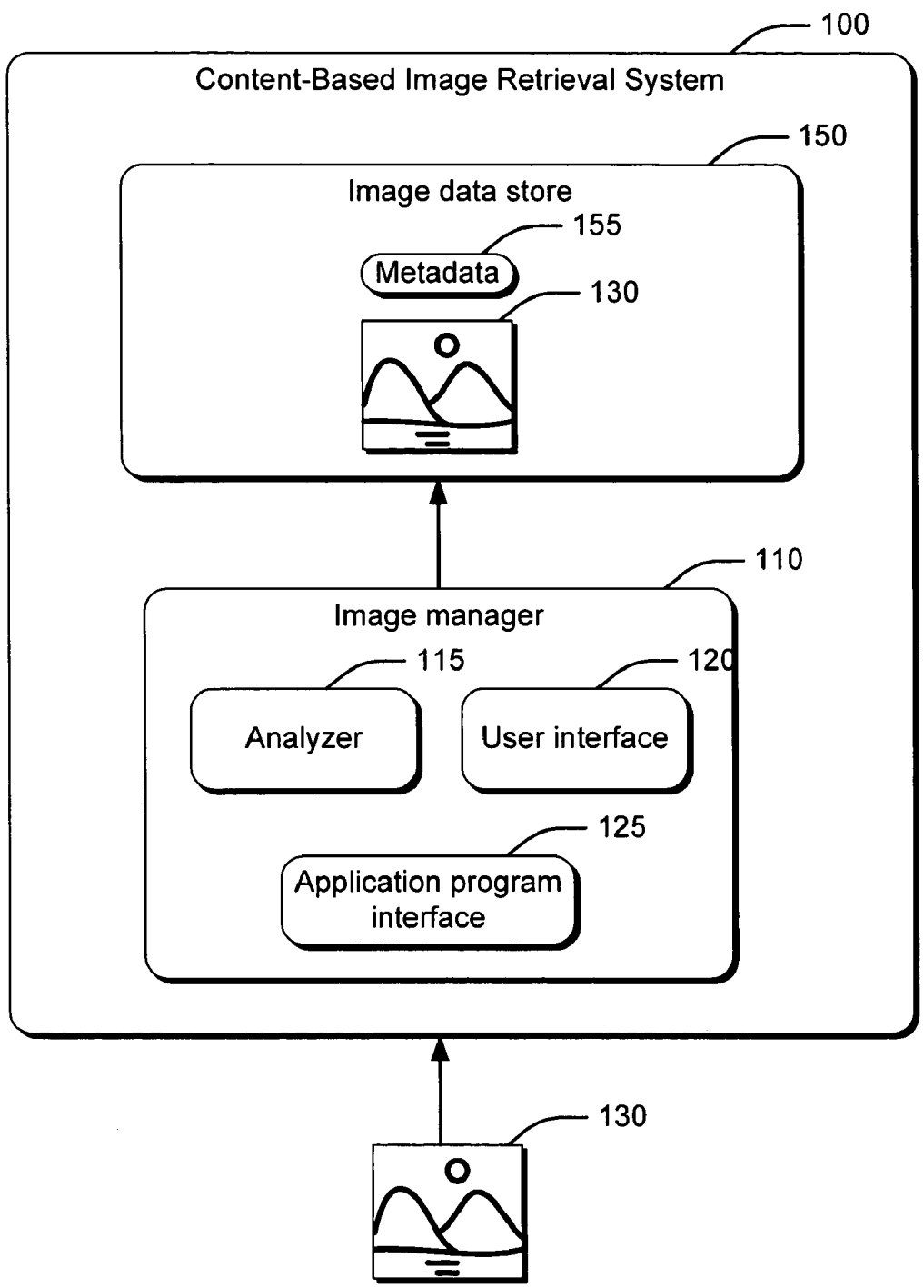
FIG. 1 is a graphical representation of a content-based image retrieval system within which the systems and methods for indexing and retrieving images can be either fully or partially implemented.

FIG. 1 is a graphical representation of a content-based image retrieval (CBIR) system 100 within which the systems and methods for indexing and retrieving images can be either fully or partially implemented. As shown in FIG. 1, CBIR system 100 includes an image manager 110 and image data store 150. Image manager 110 is a computer-executable component configured to retrieve images from image data store 150 and to organize images in image data store 150 using texture moments. Image manager 110 may use texture moments in conjunction with other visual features to achieve greater image retrieval accuracy.

A user or an application may interact with image manager 110 to retrieve or store one or more images that have certain texture moments. Image manager 110 may include user-interface 120 for interacting with a user. Application program interface 125 may be provided for applications to interact with image manager 110.

Image manager 110 is configured to receive texture moments used for retrieving images from a user or an application. Image manager 110 may be configured to receive the texture moments in the form of a reference image, such as image 130, and to retrieve images in image data store 150 that are similar to the reference image. Image manager 110 may include analyzer 115 configured to determine the textural moments of the reference image. An example process for determining texture moments for an image will be described in conjunction with FIGS. 2, 3 and 4. Briefly stated, the image is converted to a gray scale format and the texture moments are determined from the textural attributes associated with the pixels of the image. Image manager 110 may also be configured to directly receive texture moments, without using a reference image.

Image manager 110 is configured to search image data store 150 for images with texture moments similar to those of the reference image or the received texture moments. Image manager 110 may be instructed to only retrieve images in image data store 150 that exceed a specified threshold of similarity with the reference image. In one embodiment, the images in image data store 150 may be associated with metadata that includes texture moments. Image manager 110 may be configured to use the metadata to compare the texture moments of the images in image data store 150 with those of the reference image to find a match. In another embodiment, the images in image data store 150 are not associated with metadata and image manager 110 is configured to calculate texture moments of the images in data store 150 for comparison.

Image manager 110 may also be configured to use texture moments to organize images in image data store 150. In particular, image manager 110 may receive an image, such as image 130, for storage in data store 150. The texture moments of image 130 are determined and are associated with the image as metadata 155. Image manager 110 uses metadata 155 to index the image in data store 150.

Figure 2A:
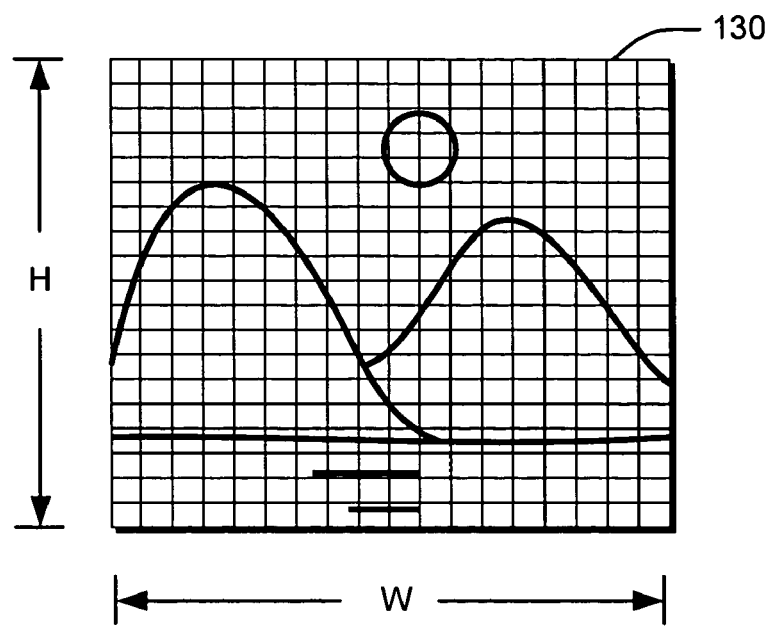
FIG. 2A is a graphical representation of the image shown in FIG. 1 in more detail.

FIG. 2A is a graphical representation of image 130 shown in FIG. 1 in more detail. Image 130 is a digital image that is represented by pixels. Image 130 may be in color or gray scale. Image 130 may be an original digital image or another type of image that has been digitized. As shown in FIG. 2A, image 130 has a dimension of "H" units high and "W" units wide.

Figure 2B:
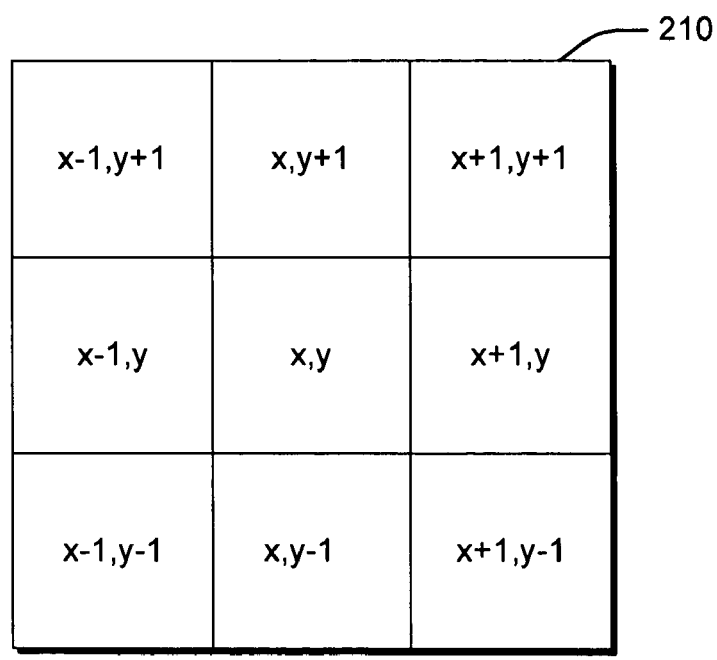
FIG. 2B is a graphical representation of the labeling conversion for pixels in the image shown in FIG. 1.

FIG. 2B is a graphical representation of the labeling conversion for pixels in image 130 shown in FIG. 1. The labeling conversion is shown for the discussion below related to the determination of texture moments. The labeling conversion is illustrated by pixel grid 210. The pixel of interest is pixel(x,y), which is represented by the center box of the pixel grid 210. Starting from the 12 o'clock position and going clockwise, the eight pixels surrounding pixel(x,y) are pixel(x,y+1), pixel(x+1,y+1), pixel(x+1,y), pixel(x+1,y−1), pixel(x,y−1), pixel(x−1,y−1), and pixel(x−1,y+1), respectively.

To calculate the texture moments, image 130 is converted to gray scale. The gray level for each pixel in image 130 is determined from the pixel's red/green/blue (RGB) levels. Gray level for a pixel can be determined in many different ways. For example, the gray level of a pixel can be determined by averaging the red, green and blue levels associated with the pixel. A simple averaging method can be used, such as $$P=(R+G+B)/3$$

where R, G, and B are the red, green and blue levels of the pixel, respectively, and P is the gray level of the pixel. The gray level of a pixel can also be determined from other averaging methods, such as:

$$P=0.299*R+0.587*G+0.114*B$$

The determination of texture moments of image 130 involves calculating textural attributes associated with the pixels in image 130. The calculation for textural attributes for each pixel typically takes into account the eight surrounding pixels, as graphically shown in FIG. 2B. For ease of calculation, the outer pixels at the edges of image 130 may be skipped since these outer pixels have less than eight surrounding pixels. Thus, for image 130, there are (H−2)*(W−2) interior pixels.

Textural attributes of each interior pixel are associated with the local texture at the location of the pixel in image 130. Since local texture for a pixel is related to its Discrete Fourier Transform in the frequency space, textural attributes of a pixel are derived from Discrete Fourier Transform coefficients associated with that pixel. The Discrete Fourier Transform for a pixel at location "x" and "y" may be represented by $$F(x, y, k) = \frac{1}{8}\sum_{n=0}^{7} I(x, y, n)e^{-j\frac{\pi}{4}kn}$$

where k can be a value from 0 to 7 and represents the eight complex values calculated by Discrete Fourier Transform from the neighborhood pixels surrounding the pixels at x and y in counter-clockwise order; and I is a function that represents the original image.

Many textural attributes may be derived from the Discrete Fourier Transform coefficients. In one embodiment, seven textual attributes are computed for the interior pixels represented by Pixel(x,y) for (1<x<W−2, 1<y<H−2)

The seven attributes for each pixel in image 130 may be computed by:

$A_1(x,y)=|P(x,y-1)+P(x,y+1)+P(x-1,y)+P(x+1,y) -P(x-1,y-1)-P(x+1,y-1)-P(x-1,y+1)-P(x+1,y+1)|$ $A_2(x,y)=|\sqrt{2}*[P(x-1,y)+P(x+1,y)-P(x,y-1)-P(x,y+1)]|$ $A_3(x,y)=|\sqrt{2}*[P(x-1,y-1)+P(x+1,y+1)-P(x+1,y-1)-P(x-1,y+1)]|$ $A_4(x,y)=|P(x-1,y-1)+\sqrt{2}*P(x-1,y)+P(x-1,y+1)-P(x+1,y-1)-\sqrt{2}*P(x+1,y)-P(x+1,y+1)|$ $A_5(x,y)=|P(x-1,y-1)+\sqrt{2}*P(x,y-1)+P(x+1,y-1)-P(x-1,y+1)-\sqrt{2}*P(x,y+1)-P(x+1,y+1)|$ $A_6(x,y)=|P(x-1,y-1)-\sqrt{2}*P(x-1,y)+P(x-1,y+1)-P(x+1,y-1)+\sqrt{2}*P(x+1,y)-P(x+1,y+1)|$ $A_7(x,y)=|P(x-1,y-1)-\sqrt{2}*P(x,y-1)+P(x+1,y-1)-P(x-1,y+1)+\sqrt{2}*P(x,y+1)-P(x+1,y+1)|$ where P(x,y) represents the gray level of the pixels at location "x" and "y" in image 130 and $A_i(x,y)$ represents the i textural attribute of the pixel. FIG. 3 shows seven templates 301-307 that graphically illustrate the seven textural attributes. These seven textural attributes are determined with an absolute value operation to simplify calculations. Other textual attributes similar to the seven textural attributes may also be derived from the Discrete Fourier Transform coefficients.

To consolidate the textural attributes of each individual pixel into usable factors that represent the entire image, statistical parameters may be used. In one embodiment, the mean and variance of each of the seven textual attributes are calculated for the interior pixels. The mean of each attribute may be calculated by:

$$\mu_i = \frac{1}{N} \sum_{y=1}^{H-2} \sum_{x=1}^{W-2} A_i(x, y)$$

for $i = 1, \cdots, 7$ where $\mu_i$ is the mean for the i textural attribute and N is the total number of values that are summed by the formula. The variance of each textural attribute may be calculated by:

$$\sigma_i = \sqrt{\frac{1}{N} \sum_{y=1}^{H-2} \sum_{x=1}^{W-2} A_i(x, y)^2 - \mu_i^2}$$

for $i = 1, \cdots, 7$ where $\sigma_i$ is the variance for the i textural attribute.

The mean and variance of these seven textural attributes constitute a 14-dimensional vector that represents the texture moments of the image.

Figure 4:
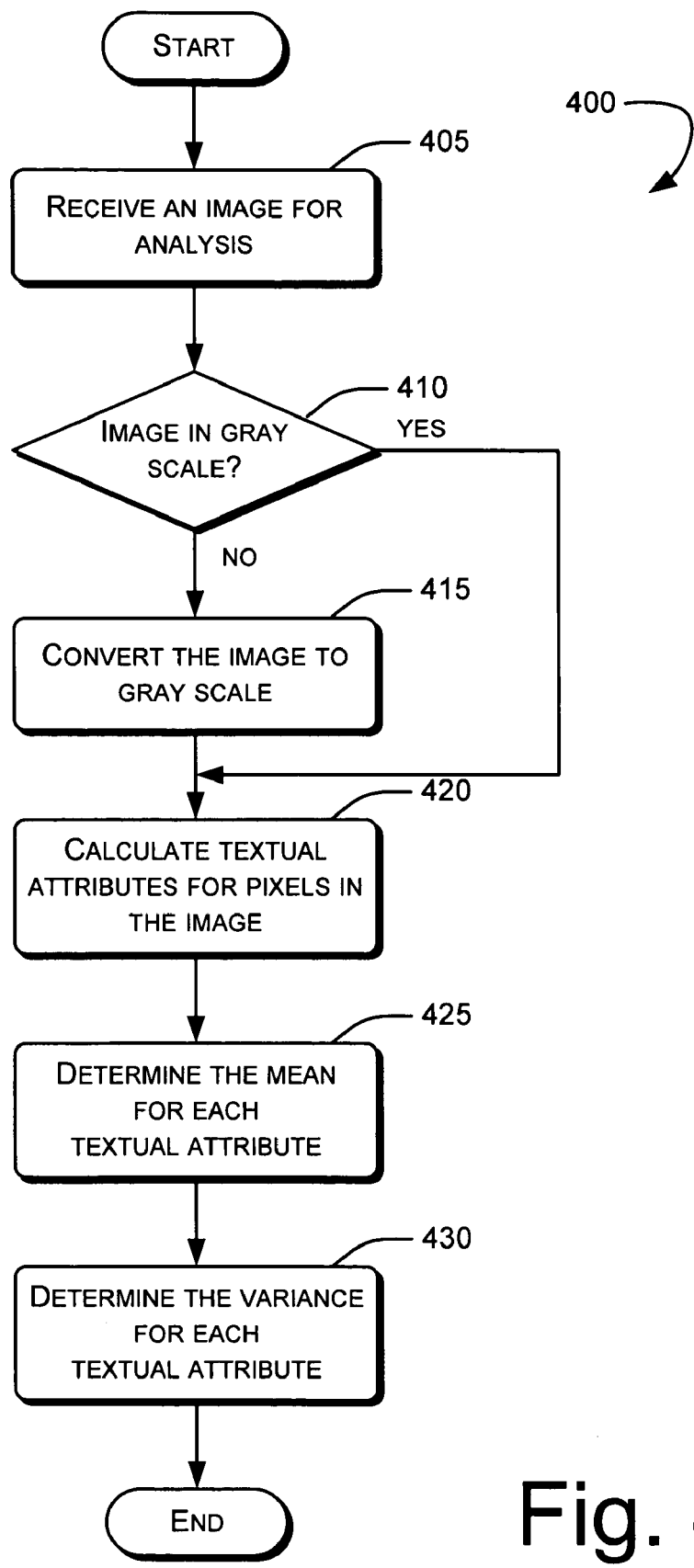
FIG. 4 is an operational flow diagram of an example process for determining texture moments of an image.

FIG. 4 is an operational flow diagram of an example process 400 for determining the texture moments of an image. Process 400 may be implemented by an image manager as part of an image retrieval process or an image indexing process. Moving from a start block, process 400 goes to block 405 where an image is received for analysis. The image may be a reference image for image retrieval or an image to be indexed.

At decision block 410, a determination is made whether the image is a gray scale image. If so, process 400 moves to block 420. If the image is not a gray scale image, the process moves to block 415 where the image is converted to a gray scale image. The image is converted to gray scale by determining the gray level of each pixel in the image. In one embodiment, the gray level for a pixel is determined by averaging the red, green and blue levels associated with the pixel. Process 400 then continues at block 420.

At block 420, the textural attributes associated with the pixels in the image are calculated. The textural attributes of a particular pixel are related to the local texture of that pixel's location in the image and are derived from coefficients of a Discrete Fourier Transform associated with the pixel. The textural attributes take other pixels surrounding the particular pixel of interest into account. Since pixels at the outer edge of the image are not surrounded by other pixels on all sides, the textural attributes of outer pixels may be excluded from process 400.

At block 425, the mean for each of the textural attributes are determined. At block 430, the variance for each textural attribute is determined. The mean and variance account for the textural attributes of each interior pixel. The mean and variance form a vector that represents the texture moments of the image. Process 400 then ends.

Figure 5:
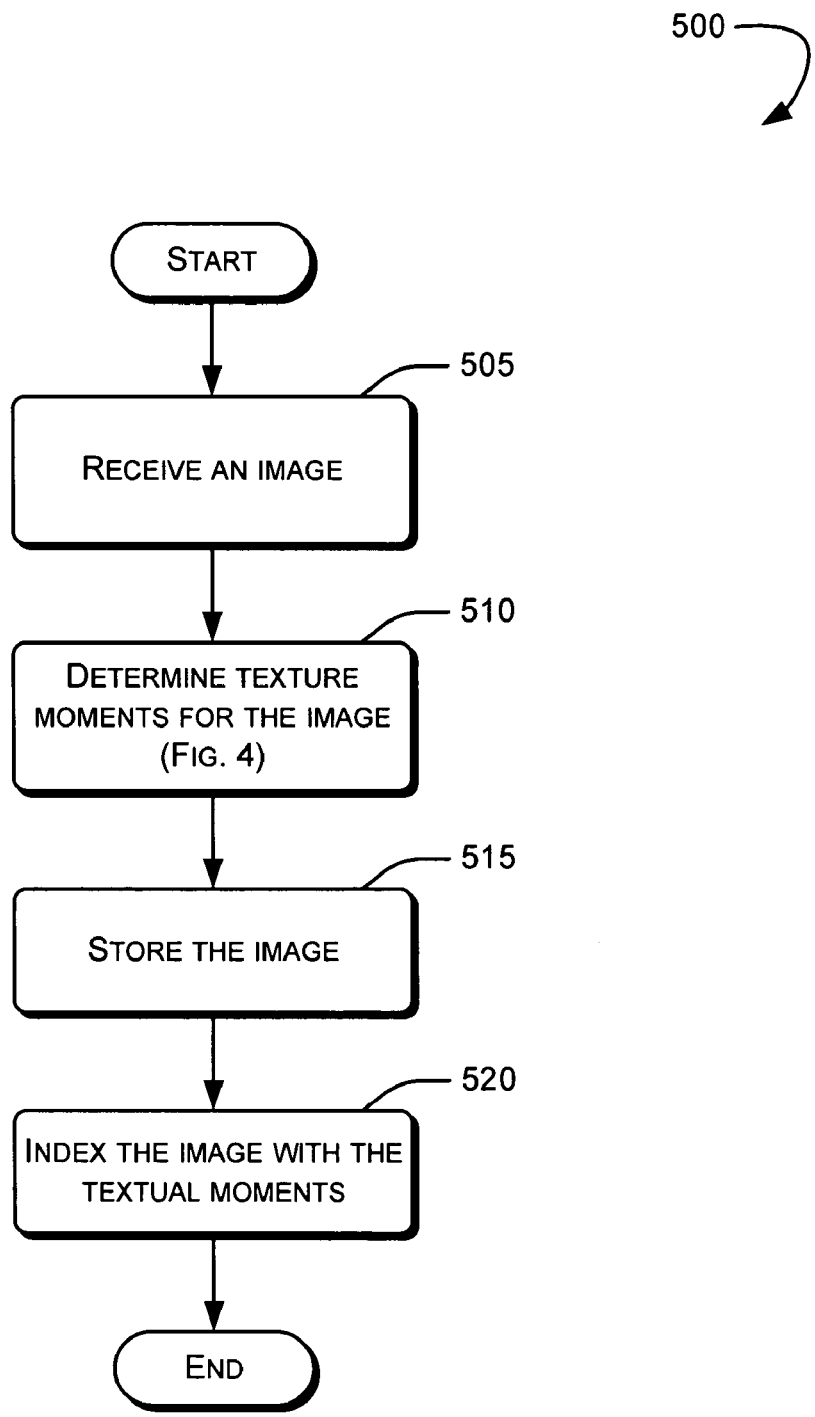
FIG. 5 is an operational flow diagram of an example process for indexing an image in a data store.

FIG. 5 is an operational flow diagram of an example process 500 for indexing an image in a data store. Process 500 may be implemented by a content-based image retrieval system for managing images and facilitating their retrieval. The data store may be a database, a file directory, or other logical data storage component. Moving from a start block, process 500 goes to block 505 where an image is received for storage in the data store. The image may be an original digital image or a digitalized version of another type of image.

At block 510, texture moments of the image are determined. The texture moments are associated with the local texture of pixels in the image and may be determined from process 400 discussed in conjunction with FIG. 4. At block 515, the image is stored in the data store. At block 520, the image is indexed with the texture moments for organizational purposes. Indexing the image with its textual moments facilitates the retrieval of the image by a user or an application. The image may be indexed in any way that associates the image with the texture moments.

Figure 6:
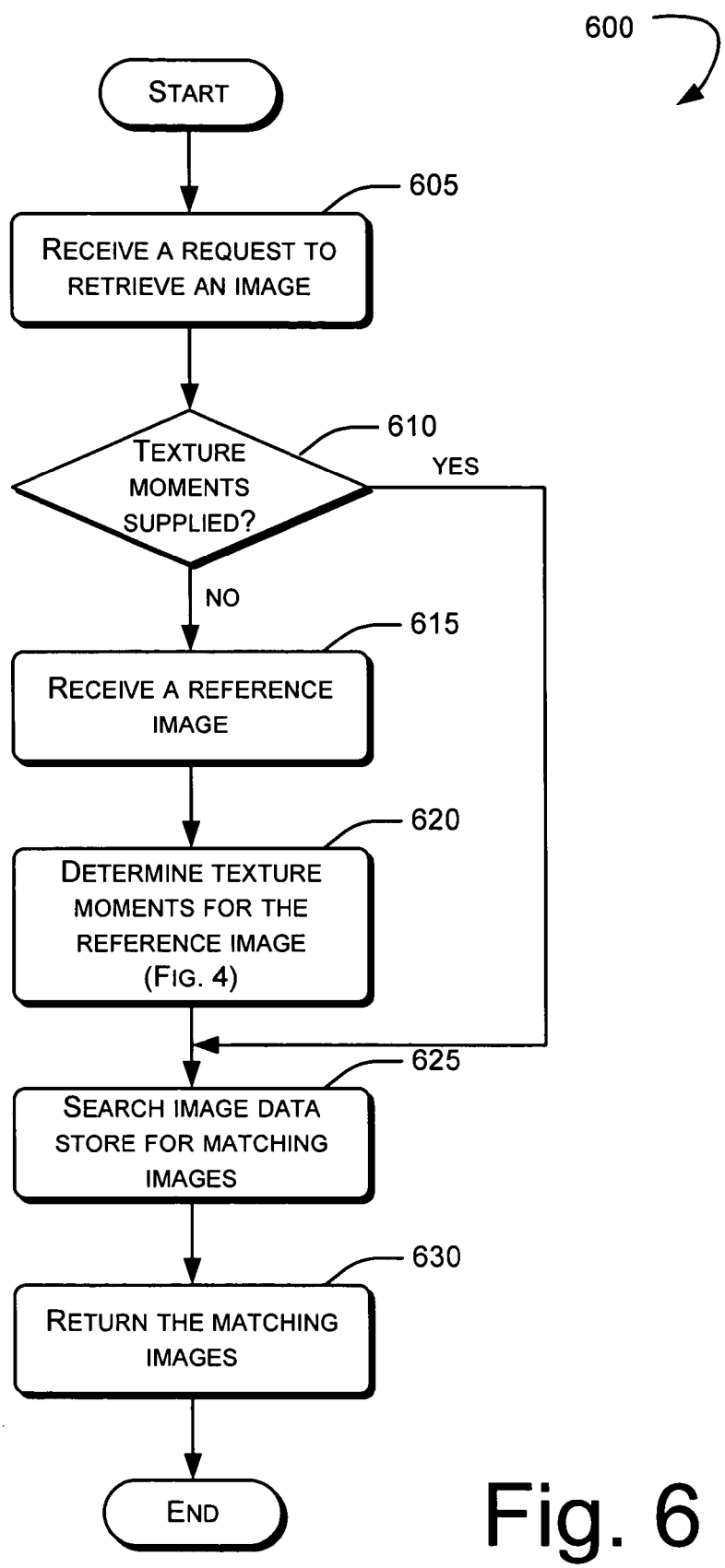
FIG. 6 is an operational flow diagram of an example process for retrieving an image from a data store.

FIG. 6 is an operational flow diagram of an example process 600 for retrieving an image from a data store. Process 600 may be implemented by a content-based image retrieval system. The image in the data store may or may not be indexed. Moving from a start block, process 600 moves to block 610 where a request to retrieve an image is received. The request may be initiated by an application or directly by a user. Typically, the request includes the desire visual features of images to be retrieved.

At decision block 610, a determination is made whether texture moments are supplied as part of the desired visual features. If so, process 600 moves to block 625. If texture moments are not supplied, process 600 continues at block 615 where a reference image is received. The reference image enables process 600 to find images with visual features similar to those of the reference image. At block 620, texture moments of the reference image are determined. The texture moments may be determined from process 400 discussed in conjunction with FIG. 4. Process 600 continues at block 625.

At block 625, the data store is searched for images that have the desired visual features. In particular, images that have texture moments comparable to those supplied or determined from the reference image are retrieved. For the purposes of image retrieval, other visual features may be used in conjunction with texture moments to improve the retrieval accuracy. Images in the data store may be indexed by their texture moments and other visual features for ease of retrieval. But, if the images in the data store are not so indexed, process 600 may determine the texture moments and other visual features of images to search for a match, which is more complicated and time consuming. At block 630, matching images are returned and the process ends.

Figure 7:
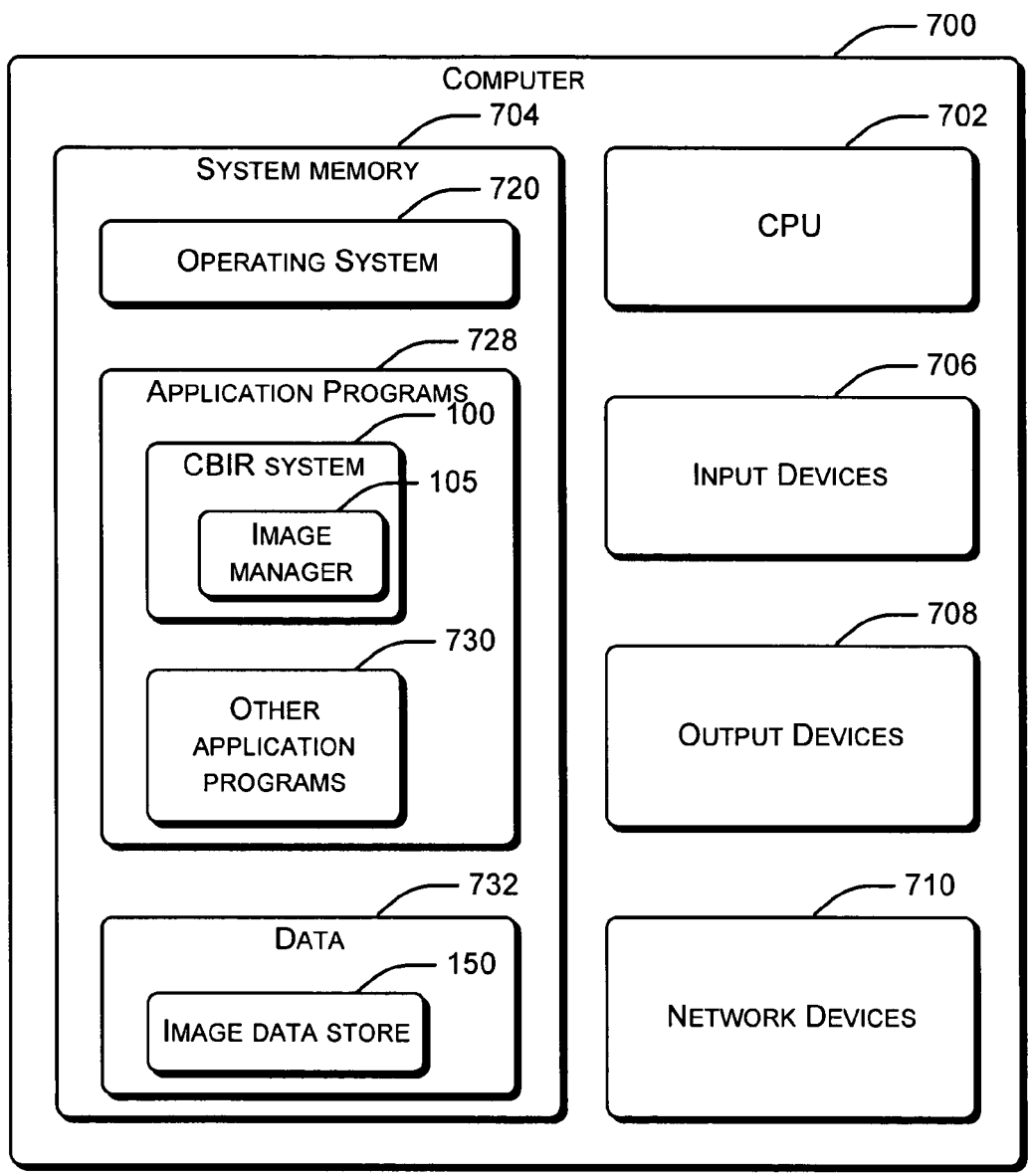
FIG. 7 illustrates an example computer within which the systems and methods for indexing and retrieving images using texture moments can be either fully or partially implemented.

FIG. 7 illustrates an example computer 700 within which the systems and methods for indexing and retrieving images can be either fully or partially implemented. Computer 700 is only one example of a computing system and is not intended to suggest any limitation as to the scope of the use or functionality of the invention.

Computer 700 can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, gaming consoles, distributed computing environments that include any of the above systems or devices, and the like.

The components of computer 700 can include, but are not limited to, processor 702 (e.g., any of microprocessors, controllers, and the like), system memory 704, input devices 706, output devices 708, and network devices 710.

Computer 700 typically includes a variety of computer-readable media. Such media can be any available media that is accessible by computer 700 and includes both volatile and non-volatile media, removable and non-removable media. System memory 704 includes computer-readable media in the form of volatile memory, such as random access memory (RAM), and/or non-volatile memory, such as read only memory (ROM). A basic input/output system (BIOS), containing the basic routines that help to transfer information between elements within computer 700, such as during start-up, is stored in system memory 704. System memory 704 typically contains data and/or program modules that are immediately accessible to and/or presently operated on by processor 702.

System memory 704 can also include other removable/non-removable, volatile/non-volatile computer storage media. By way of example, a hard disk drive may be included for reading from and writing to a non-removable, non-volatile magnetic media; a magnetic disk drive may be included for reading from and writing to a removable, non-volatile magnetic disk (e.g., a "floppy disk"); and an optical disk drive may be included for reading from and/or writing to a removable, non-volatile optical disk such as a CD-ROM, DVD, or any other type of optical media.

The disk drives and their associated computer-readable media provide non-volatile storage of computer-readable instructions, data structures, program modules, and other data for computer 700. It is to be appreciated that other types of computer-readable media which can store data that is accessible by computer 700, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement exemplary computer 700.

Any number of program modules can be stored in system memory 704, including by way of example, an operating system 720, application programs 728, and data 732. As shown in the figure, application programs 728 include content-based image retrieval system 100 with image manager 105 and other application programs 730. Data 732 includes image data store 150 that is accessible by image manager 105. Image manager 105 may be configured to access other remote image data stores through network devices 710.

Computer 700 can include a variety of computer-readable media identified as communication media. Communication media typically embodies computer-readable instructions, data structures, program modules, or other data in a modulated data signal such as a carrier wave or other transport mechanism and. includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

A user can enter commands and information into computer 700 via input devices 706 such as a keyboard and a pointing device (e.g., a "mouse"). Other input devices 706 may include a microphone, joystick, game pad, controller, satellite dish, serial port, scanner, touch screen, touch pads, key pads, and/or the like. Output devices 708 may include a CRT monitor, LCD screen, speakers, printers, and the like.

Computer 700 may include network devices 710 for connecting to computer networks, such as local area network (LAN), wide area network (WAN), and the like.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

What is claimed is:

1. A computer-implemented method for analyzing an image and retrieving similar images from a data store, comprising:
   receiving input from a user designating the image;
   converting the image to a gray scale format;
   determining textural attributes of the image;
   calculating at least one statistical value associated with at least one of the textural attributes of the image;
   determining a texture moment of the image from the statistical value;
   retrieving from the data store similar images possessing texture moments comparable to the texture moment of the image; and
   displaying the similar images to the user.

2. The computer-implemented method as recited in claim 1, wherein at least one of the textural attributes is derived from coefficients of a Discrete Fourier Transform associated with at least one pixel of the image.

3. The computer-implemented method as recited in claim 1, wherein at least one of the textural attributes is determined with an absolute value operation.

4. The computer-implemented method as recited in claim 1, wherein calculating the at least one statistical value includes calculating a mean of at least one of the textual attributes associated with pixels in the image.

5. The computer-implemented method as recited in claim 1, wherein calculating the at least one statistical value includes calculating a variance of at least one of the textual attributes associated with pixels in the image.

6. The computer-implemented method as recited in claim 1, wherein calculating the at least one statistical value includes calculating a mean and a variance of each textual attribute associated with each pixel in the image.

7. The computer-implemented method as recited in claim 1, wherein determining the textural attributes includes determining seven textural attributes associated with coefficients of a Discrete Fourier Transform associated with a pixel of the image.

8. The computer-implemented method as recited in claim 1, further comprising searching a data store for images with a texture moment similar to the determined texture moment.

9. The computer-implemented method as recited in claim 1, further comprising indexing the image based on the determined texture moment.

10. One or more computer-readable memories containing a computer program that is executable by a processor to perform the computer-implemented method recited in claim 1.

11. A computer-implemented method for determining a visual feature of an image represented by pixels and searching an image database based on the visual feature comprising:
    receiving input from a user designating the image;
    determining a gray level of each pixel of the image;

determining textural attributes of each pixel, the textural attributes being derived from coefficients of a Discrete Fourier Transform associated with the pixel;

determining a mean value for each textural attribute of each pixel;

determining a variance value for each textural attribute of each pixel;

determining texture moments representing the visual feature of the image from the mean values and the variance values;

retrieving images from the image database that have comparable texture moments as the visual feature of the image; and displaying the retrieved images to the user.

12. The computer-implemented method as recited in claim 11, wherein determining the gray level of each pixel includes calculating the gray level of the pixel using a formula:

$$P=(R+G+B)/3$$

wherein R, G, and B represent the red, green and blue levels of the pixel, respectively, and P represents the gray level of the pixel.

13. The computer-implemented method as recited in claim 11, wherein determining the gray level of each pixel includes calculating the gray level of the pixel using a formula:

$$P=0.299*R+0.587*G+0.114*B$$

wherein R, G, and B represent the red, green and blue levels of the pixel, respectively, and P represents the gray level of the pixel.

14. The computer-implemented method as recited in claim 11, wherein determining textural attributes of each pixel includes calculating at least one of the textural attributes using a formula:

$$A(x,y)=|P(x,y-1)+P(x,y+1)+P(x-1,y)+P(x+1,y)-P(x-1,y-1)-P(x+1,y-1)-P(x-1,y+1)-P(x+1,y+1)|$$

wherein A(x,y) represents the attribute of the pixel at location x and y in the image and P(x,y) represents the gray level of the pixel.

15. The computer-implemented method as recited in claim 11, wherein determining textural attributes of each pixel includes calculating at least one of the textural attributes using a formula:

$$A(x,y)=|\sqrt{2}*[P(x-1,y)+P(x+1,y)-P(x,y-1)-P(x,y+1)]|$$

wherein A(x,y) represents the attribute of the pixel at location x and y in the image and P(x,y) represents the gray level of the pixel.

16. The computer-implemented method as recited in claim 11, wherein determining textural attributes of each pixel includes calculating at least one of the textural attributes using a formula:

$$A(x,y)=|\sqrt{2}*[P(x-1,y-1)+P(x+1,y+1)-P(x+1,y-1)-P(x-1,y+1)]|$$

wherein A(x,y) represents the attribute of the pixel at location x and y in the image and F(x,y) represents the gray level of the pixel.

17. The computer-implemented method as recited in claim 11, wherein determining textural attributes of each pixel includes calculating at least one of the textural attributes using a formula:

$$A(x,y)=|P(x-1,y-1)+\sqrt{2}*P(x-1,y)+P(x-1,y+1)-P(x+1,y-1)-\sqrt{2}*P(x+1,y)-P(x+1,y+1)|$$

wherein A(x,y) represents the attribute of the pixel at location x and y in the image is and P(x,y) represents the gray level of the pixel.

18. The computer-implemented method as recited in claim 11, wherein determining textural attributes of each pixel includes calculating at least one of the textural attributes using a formula:

$$A(x,y)=|P(x-1,y-1)+\sqrt{2}*P(x,y-1)+P(x+1,y-1)-P(x-1,y+1)-\sqrt{2}*P(x,y+1)-P(x+1,y+1)|$$

wherein A(x,y) represents the attribute of the pixel at location x and y in the image and P(x,y) represents the gray level of the pixel.

19. The computer-implemented method as recited in claim 11, wherein determining textural attributes of each pixel includes calculating at least one of the textural attributes using a formula:

$$A(x,y)=|P(x-1,y-1)-\sqrt{2}*P(x-1,y)+P(x-1,y+1)-P(x+1,y-1)+\sqrt{2}*P(x+1,y)-P(x+1,y+1)|$$

wherein A(x,y) represents the attribute of the pixel at location x and y in the image and P(x,y) represents the gray level of the pixel.

20. The computer-implemented method as recited in claim 11, wherein determining textural attributes of each pixel includes calculating at least one of the textural attributes using a formula:

$$A(x,y)=|P(x-1,y-1)-\sqrt{2}*P(x,y-1)+P(x+1,y-1)-P(x-1,y+1)+\sqrt{2}*P(x,y+1)-P(x+1,y+1)|$$

wherein A(x,y) represents the attribute of the pixel at location x and y in the image and P(x,y) represents the gray level of the pixel.

21. The computer-implemented method as recited in claim 11, wherein determining the mean value for each textural attribute includes calculating at least one mean value using a formula:

$$\mu = \frac{1}{N}\sum_{y=1}^{H-2}\sum_{x=1}^{W-2} A(x,y)$$

wherein μ represents the mean value; A(x,y) represents the attribute of the pixel at location x and y; N represents the total number of values that are summed by the formula; H represents a height of the image; and W represents a width of the image.

22. The computer-implemented method as recited in claim 21, wherein determining the variance value for each textural attribute includes calculating at least one variance value using a formula:

$$\sigma = \sqrt{\frac{1}{N}\sum_{y=1}^{H-2}\sum_{x=1}^{W-2} A(x,y)^2 - \mu^2}$$

wherein σ represents the variance value.

23. One or more computer-readable memories containing a computer program that is executable by a processor to perform the computer-implemented method recited in claim 11.

24. An apparatus comprising:
means for receiving input from a user designating an image;
means for converting pixels of an image to gray scale;
means for determining textural attributes of the pixels based on local texture of the pixels;
means for calculating statistical values associated with the textural attributes for the pixels in the image;
means for determining a texture moment of the image from the statistical values;
means for retrieving from a data store, images possessing texture moments comparable to the texture moment of the image; and
means for displaying the retrieved images to the user.

25. The apparatus as recited in claim 24, further comprising means for searching a data store for images with a texture moment similar to the determined texture moment.

26. The apparatus as recited in claim 24, further comprising means for indexing the image with the determined texture moment.

27. A computer comprising:
a processor for executing instructions;
user interfaces for inputting and outputting data between a user and the computer;
a memory that includes a data store containing images;
a computer-readable medium containing instruction that when executed by the processor:
access the data store;
determine texture moments associated with a first image input by a user to the computer via one of the user interfaces;
retrieve from the data store other images that have texture moments comparable to those of the first image; and
display the other images to the user via one of the user interfaces.

28. The computer as recited in claim 27, wherein the image manager is further configured to determine the texture moments from textural attributes associated with the local texture of each pixel in the first image.

29. The computer as recited in claim 28, wherein the textural attributes are derived from local Discrete Fourier Transform coefficients.

30. The computer as recited in claim 27, wherein the image manager is further configured to determine texture moments associated with a second image and to index the second image using the associated texture moments.

31. The computer as recited in claim 27, further comprising a network interface configured to connect to a computer network,
wherein the image manager is further configured to retrieve images from a remote data store through the network interface.

* * * * *